(12) United States Patent
Tsai

(10) Patent No.: US 6,594,163 B2
(45) Date of Patent: Jul. 15, 2003

(54) REVERSE LOAD CURRENT ISOLATION CIRCUIT FOR PARALLELABLE POWER SUPPLY

(75) Inventor: Sheng-Nan Tsai, Taoyuan (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 10/016,961

(22) Filed: Dec. 14, 2001

(65) Prior Publication Data

US 2002/0044465 A1 Apr. 18, 2002

(30) Foreign Application Priority Data

Mar. 30, 2001 (TW) ........................................ 90107778 A

(51) Int. Cl.[7] ................................................ H02H 7/10
(52) U.S. Cl. .......................................... 363/50; 363/65
(58) Field of Search ........................ 363/50, 55, 56.01, 363/65, 67, 69, 71

(56) References Cited

U.S. PATENT DOCUMENTS 5,267,137 A * 11/1993 Goebel ........................ 363/87
5,583,753 A * 12/1996 Takayama .................... 363/71
6,014,322 A * 1/2000 Higashi et al. ............... 363/65
6,373,732 B1 * 4/2002 Patel et al. .................... 363/72
6,381,152 B1 * 4/2002 Takahashi et al. ....... 363/21.06
6,469,919 B1 * 10/2002 Bennett .................... 363/56.02

* cited by examiner

*Primary Examiner*—Adolf D. Berhane
(74) *Attorney, Agent, or Firm*—Mathews, Collins, Shepherd and McKay, P.A.

(57) ABSTRACT

An isolation device feasible for protecting a parallelable power supply from a reverse current comprises a field-effect transistor (FET) coupled in series between a voltage output terminal of the parallelable power supply and a load, and a transistor control circuit including a voltage comparator for detecting if a reverse current is flowing through the FET, a duty comparator circuit for detecting if an infinitesimal reverse current which is undetectable by the voltage comparator circuit is flowing through the FET, a transistor driving circuit for performing a logic AND operation with an output state of the voltage comparator circuit and an output state of the duty comparator circuit to drive the FET to turn on or off in response to the result of the logic AND operation, and an auxiliary circuit for driving the FET to turn off when the parallelable power supply is short-circuited.

17 Claims, 4 Drawing Sheets

REVERSE LOAD CURRENT ISOLATION CIRCUIT FOR PARALLELABLE POWER SUPPLY

FIELD OF THE INVENTION

The present invention is generally related to a parallelable power supply, and more particularly the present invention is directed to an isolation device for a parallelable power supply, which is agreeable to isolate the parallelable power supply from a reverse current when a reverse current is induced at the voltage output terminal of the parallelable power supply.

DESCRIPTION OF THE PRIOR ART

For the purpose of increasing the output power and promoting the reliability for a power supply system, it is desirable to connect two or more parallelable power supplies in parallel to provide a combined output power supply to a load. As shown in FIG. 1, the parallelized power supply system consists of two parallelable power supplies 11 and 12, each of which is connected in parallel by a voltage bus 13 and provides a combined power output to a load 16. The advantage of the parallelized power supply system of FIG. 1 is that in case one parallelable power supply is failed to supply power, the other one can continuously supply power without affecting the operation of the other electronic circuits in the parallelized power supply system.

However, when two or more parallelable power supplies are connected in parallel to supply combined power, and if one parallelable power supply provides an output voltage with a voltage level lower than the voltage level for which the other parallelable power supplies can provide, or one parallelable power supply is failed, an unwanted reverse current will be induced to flow into the defective parallelable power supply, so that the defective parallelable power supply behaves as a load for other parallelable power supplies. Regarding the defective parallelable power supply, its output becomes a load, which will cause a grave damage to the whole parallelized power supply system.

For the sake of averting the reverse current from flowing into the defective parallelable power supply, an isolation device is required to connect between the voltage output terminal of the parallelable power supply and the voltage bus 13 for isolating the parallelable power supply from the unwanted reverse current. In FIG. 1, two diodes 14 and 15 which are respectively placed between the voltage output terminal (not shown) of the parallelable power supplies 11 and 12 and the voltage bus 13 are taken as isolation devices for the parallelable power supplies 11 and 12. As well known in the art, the diode is substantially a unidirectional rectifying circuit. When a forward-biased voltage is applied to the diode, the diode will turn on and a forward current will be induced to flow from the anode to the cathode of the diode; on the contrary, when a reverse-biased voltage is applied to the diode, the diode will turn off instantaneously. Considering the particular electric features of the diode, it is found that the diode is quite suitable to be applied for isolating the reverse current from the parallelable power supply.

Unfortunately, the prior art of placing diode in the parallelized power supply system to prevent the reverse current will inevitably bring about some unconquerable problems. The major problem encountered by the prior art is that when the current flows through the P-N junction of the diode, a considerable power loss will be produced. In view of the foregoing problems, taking a transistor such as a field effect transistor (FET) to replace the diodes as the isolation device to prevent the reverse current for the parallelable power supply will reduce the power loss in the parallelized power supply system and enhance the overall efficiency of the parallelized power supply system.

Nonetheless, the known FET is a bi-directional circuit, and the fundamentals for turning on and off the FET is not as simple as the diode. Therefore, if it is intended to use the FET as the isolation device for preventing the reverse current from flowing into the parallelable power supply, a high speed and high accuracy control circuit must be provided to control the FET to turn on when a forward current flows out of the parallelable power supply and control the FET to turn off when a reverse current flows into the parallelable power supply.

It is highly desirable to provide an isolation device which can rapidly and precisely prevent the reverse current from flowing into the parallelable power supply, while can address the problem of significant power loss encountered by the prior art of using diode as an isolation device for the parallelable power supply.

SUMMARY OF THE INVENTION

It is therefore an object of the present invention to provide an isolation device adapted for a parallelable power supply which can rapidly and precisely prevent a reverse current from flowing into the parallelable power supply under the circumstances of low power loss.

It is a further object of the present invention to provide an isolation device for use in a parallelized power supply system for preventing a reverse current from flowing into one of the parallelable power supplies, in which the parallelized power supply system is constructed from a plurality of parallelable power supplies connected in parallel by a voltage bus.

According to a first preferred embodiment of the present invention, an isolation device for protecting the parallelable power supply from a reverse current flowing from a load to the parallelable power supply includes a transistor having a first terminal connected to an output voltage terminal of the parallelable power supply and a second terminal connected to the load, and a transistor control circuit for driving the transistor to turn on when a forward current flows from the parallelable power supply into the load and driving the transistor to turn off when a reverse current flows from the load into the parallelable power supply.

The transistor is preferably embodied in a field effect transistor (FET), and the aforementioned transistor control circuit further comprises a voltage comparator circuit including a comparator for comparing an output voltage of the parallelable power supply with an external voltage of the parallelable power supply and in response thereto, outputs a first control signal; a duty comparator circuit including a comparator for comparing a voltage representing an output duty of the transformer of the parallelable power supply with a reference voltage and in response thereto, outputs a second control signal; and a transistor driving circuit for performing a logic AND operation with the first control signal and the second control signal for driving the transistor to turn on or off in response to a result of the logic AND operation, so as to disallow a reverse current to flow into the parallelable power supply.

In addition, in the first preferred embodiment of the present invention, the transistor control circuit further comprises an auxiliary circuit for preventing a reverse current from flowing into the parallelable power supply when the parallelable power supply is short-circuited. The auxiliary circuit is constructed of a memory element, for example, a capacitor, which memorizes the output voltage level of the parallelable power supply and discharging the electric energy stored therein to an inverting input terminal of the comparator of the voltage comparator circuit when the parallelable power supply is short-circuited, and a voltage switch, for example, a diode, for being controlled by the memory element to establish a discharge loop for the memory element to discharge the electric energy stored therein to an inverting input terminal of the comparator of the voltage comparator circuit, thereby driving the comparator of the voltage comparator circuit to turn the transistor off.

An alternative circuit topology for the above-described auxiliary circuit is provided with a second embodiment of the present invention. The auxiliary circuit according to the second embodiment of the present invention is constructed of a memory element, for example, a capacitor, which memorizes the output voltage level of the parallelable power supply and discharging the electric energy stored therein when the parallelable power supply is short-circuited, and a gate driving circuit which is formed of a bipolar junction transistor (BJT) for driving the transistor to turn off when the parallelable power supply is short-circuited by way of receiving the discharged electric energy from the memory element.

In relation to a further aspect of the present invention, an isolation device for use in a parallelized power supply system, wherein the parallelized power supply system is formed of two or more parallelable power supplies connected in parallel by a voltage bus, is provided to couple in series between an voltage output terminal of one of the parallelable power supplies and the voltage bus for preventing a reverse current from flowing into the corresponding one of the parallelable power supplies. The isolation device comprises a field effect transistor (FET) having a first terminal connected to the voltage output terminal of the corresponding one of the parallelable power supply and the voltage bus, a voltage comparator circuit comprising a voltage comparator which compares an output voltage of the corresponding one of the parallelable power supplies with an input voltage of the voltage bus and in response thereto, outputs a first control signal, a duty comparator circuit comprising a comparator which compares a voltage representing an output duty of a transformer of the corresponding one of the parallelable power supplies with a reference voltage and in response thereto, outputs a second control signal, a transistor driving circuit which performs a logic AND operation with the first and the second control signals and drives the FET to turn on or off depending on a result of the logic AND operation, so as to prevent a reverse current from flowing into the corresponding one of the parallelable power supplies.

According to a second aspect of the present invention, the isolation device further comprises an auxiliary circuit for preventing a reverse current from flowing into the parallelable power supply when the parallelable power supply is short-circuited. The auxiliary circuit is constructed of a memory element, for example, a capacitor, which memorizes the output voltage level of the parallelable power supply and discharging the electric energy stored therein to an inverting input terminal of the comparator of the voltage comparator circuit when the parallelable power supply is short-circuited, and a voltage switch, for example, a diode, for being controlled by the memory element to establish a discharge loop for the memory element to discharge the electric energy stored therein to an inverting input terminal of the comparator of the voltage comparator circuit, so as to drive the comparator of the voltage comparator circuit to turn the FET off.

The foregoing auxiliary circuit can be designed to have a different layout. According to a second embodiment of the present invention, the auxiliary circuit is constructed of a memory element, for example, a capacitor, which memorizes the output voltage level of the parallelable power supply and discharges the electric energy stored therein when the parallelable power supply is short-circuited, and a gate driving circuit which is formed of a bipolar junction transistor (BJT) for driving the FET to turn off when the parallelable power supply is short-circuited by way of receiving the discharged electric energy from the memory element.

Now the foregoing and other features and advantages of the present invention will be more clearly understood through the following descriptions with reference to the accompanying drawings, in which:

DETAILED DESCRIPTION OF THE PREFERRED EMBODIMENTS

Figure 1:
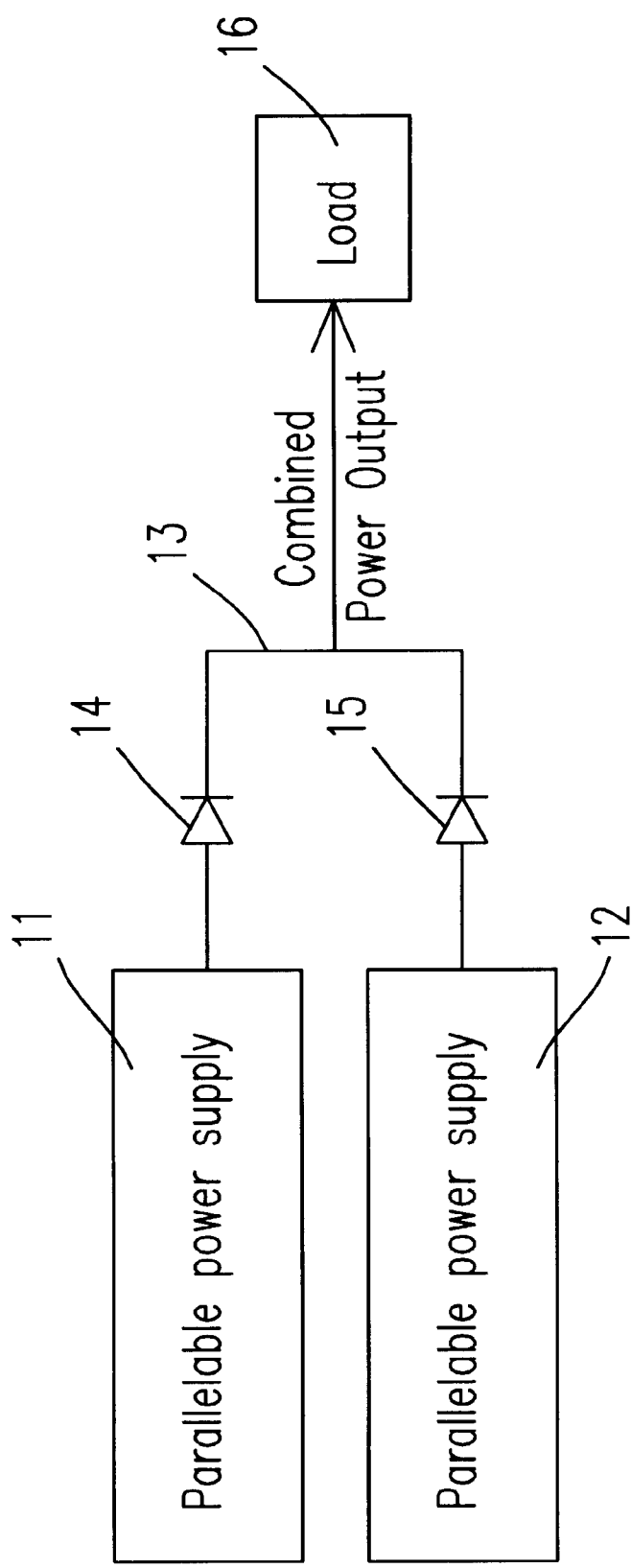
FIG. 1 schematically illustrates a circuit block diagram of a conventional parallelized power supply system.
Figure 2:
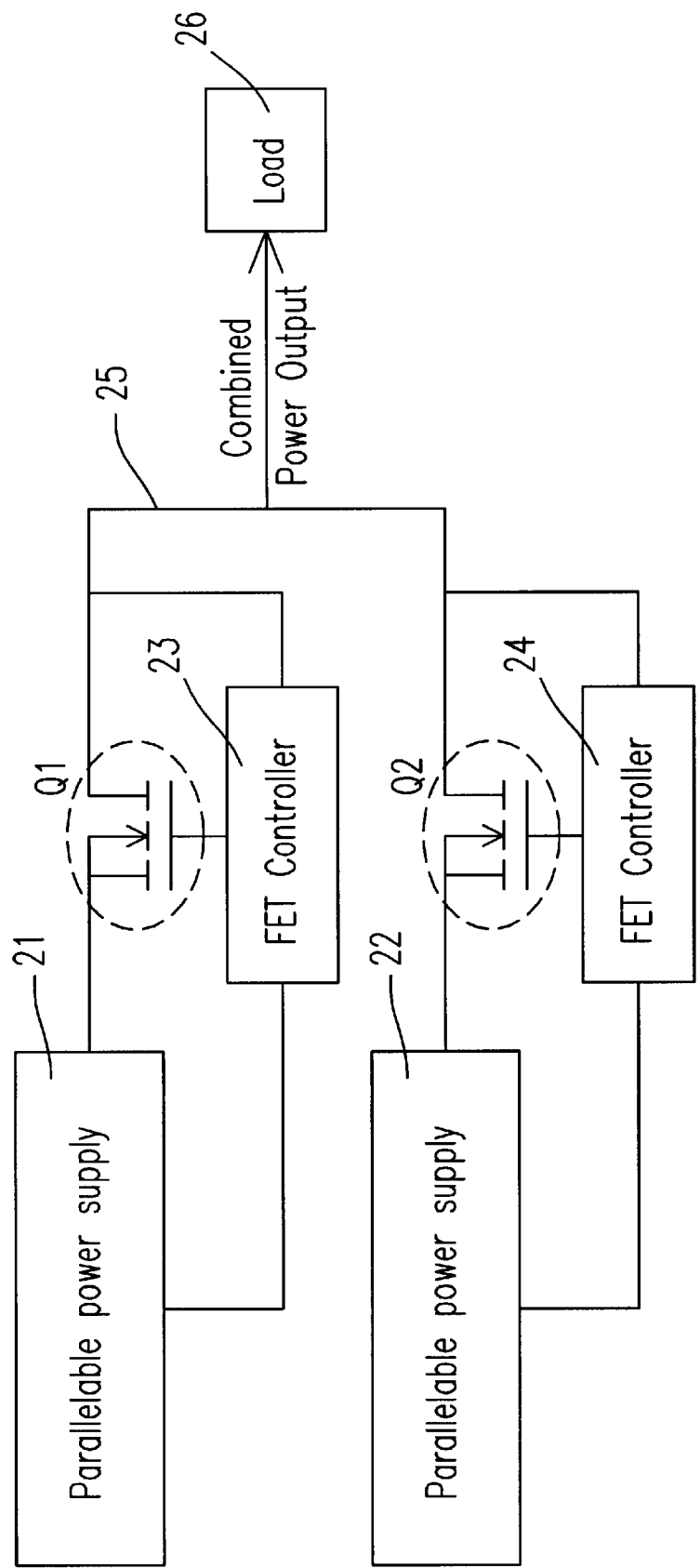
FIG. 2 is a circuit block diagram illustrating the parallelized power supply system according to a preferred embodiment of the present invention.

Turning to FIG. 2, according to an embodiment of the present invention, a parallelized power supply system is provided to provide a combined output power to a load 26. The parallelized power supply system according to a preferred embodiment of the present invention is comprised of two parallelable power supplies 21 and 22 connected in parallel by a voltage bus 25. In order to prevent a reverse current from flowing into a parallelable power supply and resulting in a significant power loss, the present invention respectively provides two field-effect transistors (FET) $Q_1$ and $Q_2$ (which is commonly referred to by the designation "ORING MOSFET") in place of the diodes as the isolation device for each of the parallelable power supplies 21 and 22. As discussed above, the control mechanism for the FET is not as simple as the diode. For the purpose of controlling the FET to turn on when a forward current (the current flow is directed from the source to drain of the FET) flows therethrough and cotnrolling the FET to turn off when a reverse current (the current flow is directed from the drain to source of the FET) flows therethrough, a complex and precise control circuit is essential for the FET to control the on/off operation of the FET. As indicated in FIG. 2, two parallelable power supplies 21 and 22 are connected in parallel by a voltage bus 25, and two FETs $Q_1$ and $Q_2$ respectively act as the isolation device for each of the paralleable power supplies 21 and 22. The FET controllers 23 and 24 respectively serve as the control circuit for controlling the on/off state of the FETs $Q_1$ and $Q_2$.

Figure 3:
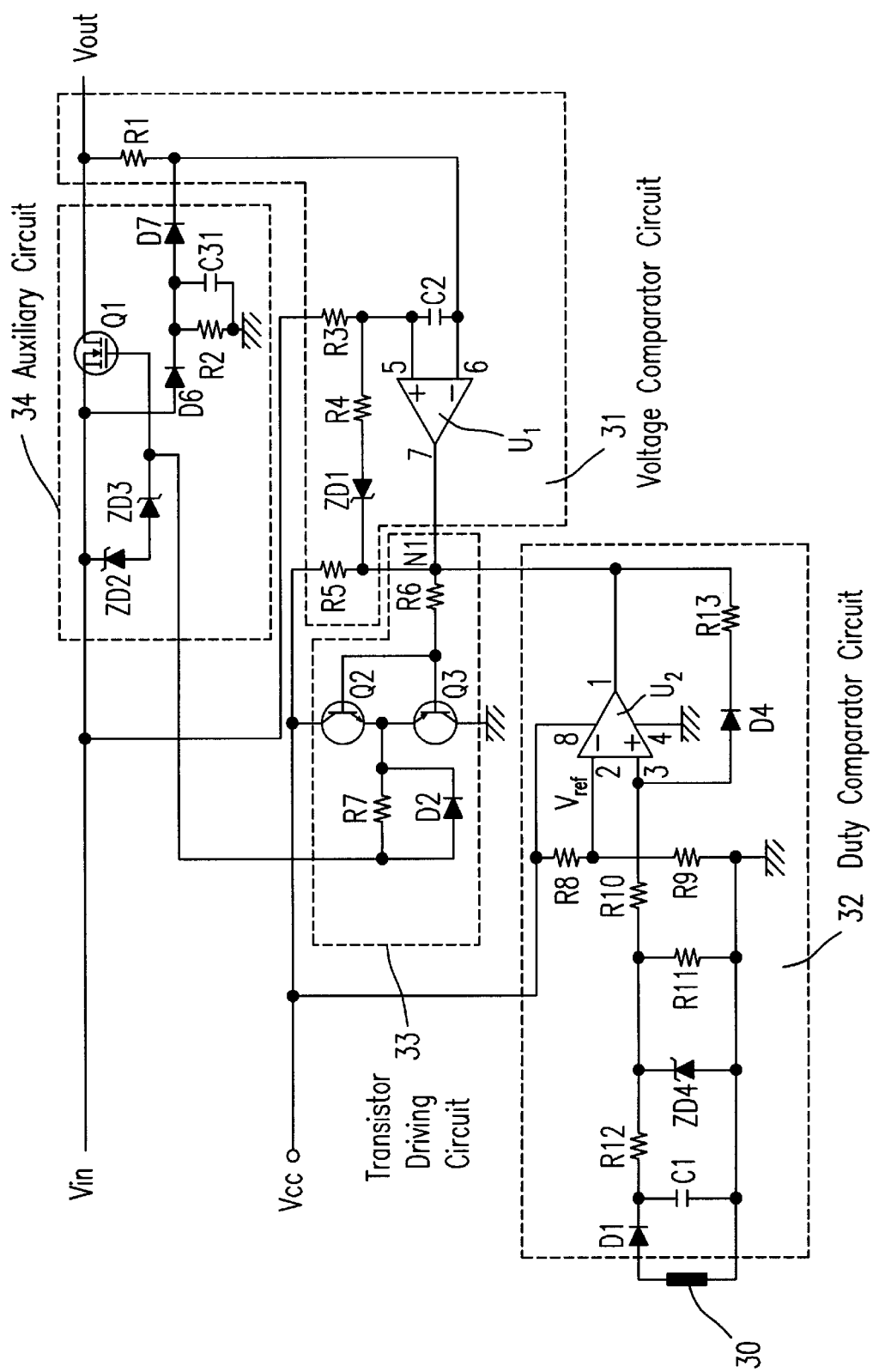
FIG. 3 demonstrates a circuitry of the transistor together with the transistor control circuit as the isolation device for the parallelable power supply according to a first preferred embodiment of the present invention.

In connection with the circuit structure of the FET and the control circuit thereof, it can be best understood with reference to the circuit topological view of FIG. 3. Referring to FIG. 3, according to a first preferred embodiment of the present invention, the control circuit for the FET $Q_1$ is constructed from a voltage comparator circuit 31, a duty comparator circuit 32, a transistor driving circuit 33 and an auxiliary circuit 34. The voltage comparator circuit 31 comprises a voltage comparator $U_1$ which compares the output voltage $V_{in}$ of the parallelable power supply with the an input voltage $V_{out}$ of the voltage bus (which implies the drain voltage of the FET $Q_1$). Theoretically, as long as the input voltage $V_{out}$ of the voltage bus is greater than the output voltage $V_{in}$ of the parallelable power supply, a reverse current will be induced and the output state of the voltage comparator $U_1$ will transit to a low state, which will directly fed into the gate of the transistor $Q_1$ to drive the transistor $Q_1$ to turn off and prevent the reverse current from flowing into the parallelable power supply accordingly. In this respect, it is feasible to rapidly and precisely control the FET $Q_1$ to turn off as a reverse current is induced simply by using a voltage comparator $U_1$ to compare the voltage difference between the drain voltage and the source voltage of the transistor $Q_1$.

Actually, the voltage comparator $U_1$ has its own offset voltage, and the voltage difference between the input voltage $V_{out}$ of the voltage bus and the output voltage $V_{in}$ of the parallelable power supply has to be sufficiently large to overcome the offset voltage of the voltage comparator $U_1$, so that the output state of the voltage comparator $U_1$ can transit to a low state to turn off the transistor $Q_1$. Unfortunately, the resistance value of the transistor $Q_1$ itself is very small, therefore the reverse current flowing through the transistor $Q_1$ has to be high to a certain degree that the voltage difference between the drain voltage and the source voltage of the transistor $Q_1$ can overcome the offset voltage of the voltage comparator $U_1$ itself, such that the voltage comparator circuit 31 is capable of driving the transistor Q1 to turn off. In this way, the design technique by using a voltage comparator circuit 31 to prevent a reverse current from flowing into a parallelable power supply is not able to fulfill with the requirements of high speed and high accuracy. For this reason, an assistant circuit is needed to make up for the disadvantage that the voltage comparator circuit 31 is incapable of detecting an infinitesimal reverse current and preventing the infinitesimal reverse current from flowing into a parallelable power supply.

With the intention of enabling the transistor $Q_1$ to be driven to turn off even the reverse current is quite infinitesimal, a duty comparator circuit 32 is added to the transistor control circuit of FIG. 3 to subserve the voltage comparator circuit 31 to control the on/off state operation of the transistor $Q_1$. The design rule and operating principle about the duty comparator circuit 32 is based on making use of an important parameter for a power supply, namely, an output duty of the transformer of the power supply. If the parallelable power supply can provide an output current, an output duty greater than zero can be obtained on the secondary side of the transformer. If the parallelable power supply has no output current, the output duty of the transformer will be dropped to zero. The duty comparator circuit 32 is applied to inspect the output duty of the transformer of the parallelable power supply, and the duty comparator $U_2$ of the duty comparator circuit 32 is used to select a peak charging voltage at the secondary side 30 of the transformer which represents the output duty of the transformer to compare with a reference voltage $V_{ref}$ (the reference voltage $V_{ref}$ is obtained by diving an external voltage $V_{cc}$ by means of a voltage divider comprising resistors $R_8$ and $R_9$). If the peak charging voltage at the secondary side of the transformer which represents the output duty of the transformer is lower than the reference voltage $V_{ref}$, the output state of the duty comparator U2 will transit to a low state to drive the transistor $Q_1$ to turn off.

As regards the manner for determining the on/off state of the transistor $Q_1$ by the voltage comparator $U_1$ and the duty comparator $U_2$, it is resolved by the transistor driving circuit 33. The transistor driving circuit 33 comprises two bipolar junction transistors $Q_2$ and $Q_3$, resistors $R_6$ and $R_7$ and a diode $D_2$. The transistor driving circuit 33 is used to provide the gate voltage for driving the transistor $Q_1$ to switch its on/off state. The driving capability of the transistor driving circuit 33 to drive the transistor $Q_1$ is determined by doing a logic AND operation at a circuit node $N_1$ with an output state of the voltage comparator $U_1$ and an output state of the duty comparator $U_2$. If one of the comparators $U_1$ and $U_2$ has a low output state, the base voltage of both the transistors $Q_2$ and $Q_3$ will be at a low level, and both of the transistors $Q_2$ and $Q_3$ will be turned off so that the emitter voltage of both the transistors $Q_2$ and $Q_3$ will be at a low level. Then the gate driving voltage (which indicates the emitter voltage of both the transistors $Q_2$ and $Q_3$) provided by the transistor driving circuit 33 is at a low level and the transistor $Q_1$ will be turned off. If both the output state of the comparators $U_1$ and $U_2$ are at a high state, the base voltage of both the transistors $Q_2$ and $Q_3$ will be at a high level, and both of the transistors $Q_2$ and $Q_3$ will be turned on so that the emitter voltages of both the transistors $Q_2$ and $Q_3$ will be at a high level. Then the gate driving voltage (which indicates the emitter voltages of both the transistors $Q_2$ and $Q_3$) provided by the transistor driving circuit 33 is at a high level and the transistor $Q_1$ will be turned on.

The operating fundamentals for the isolation device for parallelable power supply will now be illustrated in detail as follows. When the parallelable power supply is powered on, because the output voltage of the parallelable power supply $V_{in}$ is greater than the external voltage $V_{out}$ of the parallelable power supply, the transformer of the parallelable power supply can provide a considerably high output duty and the output states of both the voltage comparator $U_1$ and the duty comparator $U_2$ are at a high state. For a space of time, if the external voltage $V_{out}$ of the parallelable power supply is greater than the output voltage $V_{in}$ of the parallelable power supply, an infinitesimal reverse current will be induced. Although the output state of the voltage comparator $U_1$ maintains at a high state due to the offset voltage itself, however, the duty comparator $U_2$ will perceive that the output duty of the transformer of the parallelable power supply is dropped to a certain extent that is lower than the reference voltage $V_{ref}$, the output state of the duty comparator $U_2$ will transit to a low state, whereby driving the transistor driving circuit 33 to turn off the transistor $Q_1$. When the output duty of the transformer of the parallelable power supply is dropped, the output voltage of the parallelable power supply will also be dropped so that the voltage difference between the output voltage $V_{in}$ of the parallelable power supply and the external voltage $V_{out}$ of the parallelable power supply is boosted, and the output state of the voltage comparator $U_1$ will transit to a low state accordingly. At the same time, in order to maintain the power dissipation of the parallelable power supply on a certain level, the output duty of the transformer of the parallelable power supply will be forced to boost so that the duty comparator $U_2$ will have a high output state. However, the transistor $Q_1$ is still turned off for the time being. Once the output voltage $V_{in}$ of the parallelable power supply is boosted up to be equal to the external voltage $V_{out}$ of the parallelable power supply, the parallelable power supply can provide a forward current for output and the output state of the voltage comparator $U_1$ returns to a high state, and the transistor $Q_1$ is turned on.

In association with the design envision of the auxiliary circuit 34, it is employed to prevent a reverse current from flowing into a parallelable power supply as the parallelable power supply is short-circuited to ground. The auxiliary circuit 34 comprises a memory element, for example, a capacitor $C_{31}$. When the parallelable power supply is normally operating, the output voltage $V_{in}$ will be at a high level and the diode $D_6$ will turn on. The output voltage $V_{in}$ will charge the capacitor $C_{31}$ through the diode $D_6$. The capacitor $C_{31}$ is applicable to memorize the voltage level of the output voltage $V_{in}$ of the parallelable power supply. When the parallelable power supply is short-circuited to ground, its output voltage will be dropped and the diode $D_6$ will turn off. The capacitor $C_{31}$ as a memory element will charge the inverting input terminal 6 of the voltage comparator $U_1$ through the diode $D_7$. The diode $D_7$ is used to establish a discharge loop for the capacitor $C_{31}$ when the parallelable power supply is short-circuited to ground. While the voltage level at the inverting input terminal 6 of the voltage comparator $U_1$ is high, the output state of the voltage comparator $U_1$ will transit to a low state to drive the transistor $Q_1$ to turn off and hence prevent the reverse current from flowing into the parallelable power supply.

Figure 4:
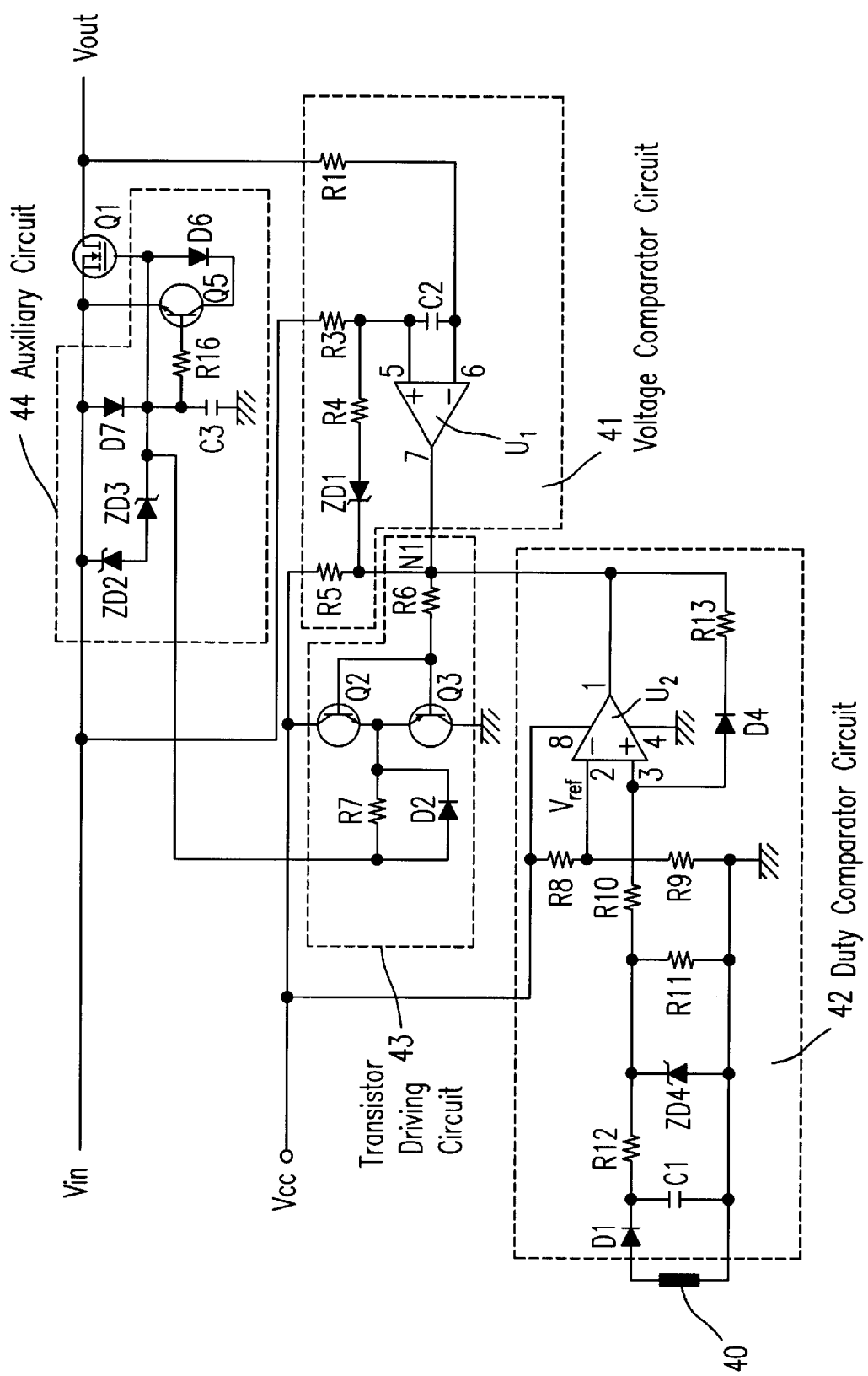
FIG. 4 demonstrates a circuitry of the transistor together with the transistor control circuit as the isolation device for the parallelable power supply according to a second preferred embodiment of the present invention.

FIG. 4 shows a circuit topological view of the transistor $Q_1$ together with the transistor control circuit as the isolation device for the parallelable power supply according to a second preferred embodiment of the present invention. Comparing the embodiment of FIG. 4 to the embodiment of FIG. 3, it can be seen that the secondary side 40 of the transformer of the parallelable power supply, the voltage comparator circuit 41, the duty comparator circuit 42 and the transistor driving circuit 43 of FIG. 4 are respectively the counterparts of the secondary side 30 of the transformer of the parallelable power supply, the voltage comparator circuit 31, the duty comparator circuit 32 and the transistor driving circuit 33 of FIG. 3, and the circuit configuration and the operating principle of the circuitry of FIG. 4 are similar to those of FIG. 3. However, the auxiliary circuit 44 of FIG. 4 introduces a different circuit layout comparing to the auxiliary circuit 34 of FIG. 3. In FIG. 4, the auxiliary circuit 44 is formed of a memory element, for example, a capacitor $C_3$. When the parallelable power supply is normally operating, its output voltage $V_{in}$ will be at a high level and the diode $D_7$ will turn on. The output voltage $V_{in}$ will charge the capacitor $C_3$ through the diode $D_7$. The capacitor $C_3$ is used to memorize the voltage level of the output voltage $V_{in}$ of the parallelable power supply. When the parallelable power supply is short-circuited to ground, its output voltage $V_{in}$ will be dropped and the diode $D_7$ will turn off, such that the capacitor $C_3$ will discharge the electric energy stored therein to the base of the bipolar junction transistor (or BJT) $Q_5$ through the resistor $R_{16}$. The BJT $Q_5$ acts as a gate driving circuit for driving the gate of the transistor $Q_1$ to control the on/off operation of the transistor $Q_1$. While the base voltage of the BJT Q5 is high, the BJT Q5 will turn on to drive the transistor Q5 to turn off, so as to prevent a reverse current from flowing into the parallelable power supply.

In sum, it is to be readily known from the above discussion that according to the present invention a field-effect transistor (FET) is employed to the parallelable power supply as an isolation device, and therefore the power loss will be reduced significantly. Also, a FET controller is collocated with the FET to rapidly and precisely control the FET to turn on when a forward current with respect to the parallelable power supply flows therethrough and control the FET to turn off when a reverse current with respect to the parallelable power supply flows therethrough. The FET controller of the present invention utilizes a voltage comparator circuit to compare the external voltage of the parallelable power supply with the output voltage of the parallelable power supply and in response thereto, turns the FET on or off. Further, the present makes use of a duty comparator circuit to detect an infinitesimal reverse current which is undetectable by the voltage comparator circuit by detecting if the output duty of the transformer of the parallelable power supply is dropped. Consequently the drawbacks that the voltage comparator circuit can not detect an infinitesimal current due to its offset voltage can be eliminated. As to the switch operation of the FET, it is resolved by a transistor circuit which performs a logic AND operation with the output states of the voltage comparator circuit and the duty comparator circuit to drive the FET to turn on or off depending on the result of the logic AND operation. The present invention additionally locates an auxiliary circuit to drive the FET to turn off when the parallelable power supply is short-circuited. The isolation device of the present invention can not only reduce the power loss of the power supply system, but can swiftly and precisely prevent a reverse current from flowing into a parallelable power supply.

Those of skill in the art will recognize that these and other modifications can be made within the spirit and scope of the invention as defined in the appended claims.

What is claim is:

1. An isolation device for isolating a parallelable power supply from a reverse current flowing from a load into said parallelable power supply, comprising:

a transistor having a first terminal connected to an output voltage terminal of said parallelable power supply and a second terminal connected to said load;

a voltage comparator circuit comprising a comparator for comparing an output voltage of said parallelable power supply with an external voltage of said parallelable power supply and in response thereto, outputs a first control signal;

a duty comparator circuit comprising a comparator for comparing a voltage representing an output duty of a transformer of said parallelable power supply with a reference voltage and in response thereto, outputs a second control signal; and a transistor driving circuit which performs a logic AND operation with said first control signal and said second control signal for driving said transistor to turn on or off in response to a result of said logic AND operation, whereby disallowing said reverse current to flow into said parallelable power supply wherein said transistor is driven to turn on when a forward current flows from said parallelable power supply into said load and is driven to turn off when said reverse current flows from said load into said parallelable power supply.

2. An isolation device according to claim 1 wherein said transistor comprises a field effect transistor.

3. An isolation device according to claim 1 wherein said transistor control circuit further comprises an auxiliary circuit for preventing said reverse current from flowing into said parallelable power supply when said parallelable power supply is short-circuited.

4. An isolation device according to claim 3 wherein said auxiliary circuit comprises:
- a memory element which memorizes an output voltage level of said parallelable power supply and discharging an electric energy stored therein to an inverting input terminal of said comparator of said voltage comparator circuit when said parallelable power supply is short-circuited; and
- a voltage switch for being controlled by said memory element to establish a discharge loop for said memory element to discharge said electric energy stored therein to an inverting input terminal of said comparator of said voltage comparator circuit, thereby driving said comparator of said voltage comparator circuit to turn said transistor off.

5. An isolation device according to claim 4 wherein said memory element comprises a capacitor.

6. An isolation device according to claim 4 wherein said voltage switch comprises a diode.

7. An isolation device according to claim 3 wherein said auxiliary circuit comprises:
- a memory element which memorizes an output voltage level of said parallelable power supply and discharging an electric energy stored therein to an inverting input terminal of said comparator of said voltage comparator circuit when said paarallelable power supply is short-circuited; and
- a gate driving circuit for receiving said electric energy from said memory element to drive said transistor to turn off when said parallelable power supply is short-circuited.

8. An isolation device according to claim 7 wherein said memory element comprises a capacitor.

9. An isolation device according to claim 7 wherein said gate driving circuit comprises a bipolar junction transistor.

10. A device for use in a parallelized power supply system which comprises a plurality of parallelable power supplies connected in parallel by a voltage bus, wherein said device is connected in series between one of said parallelable power supplies and said voltage bus for preventing a reverse current from flowing into said one of said parallelable power supplies, comprising:
- a field effect transistor having a first terminal connected to said one of said parallelable power supplies and a second terminal connected to said voltage bus;
- a voltage comparator circuit comprising a comparator which compares an output voltage of said one of said parallelable power supplies with an input voltage of said voltage bus and in response thereto, outputs a first control signal;
- a duty comparator circuit comprising a comparator which compares a voltage representing an output duty of a transformer of said one of said parallelable power supplies with a reference voltage and in response thereto, outputs a second control signal; and
- a transistor driving circuit which performs a logic AND operation with said first control signal and said second control signal for driving said field effect transistor to turn on or off in response to a result of said logic AND operation.

11. A device according to claim 10 further comprising an auxiliary circuit for preventing a reverse current from flowing into said one of said parallelable power supplies when said one of said parallelable power supplies is short-circuited.

12. A device according to claim 11 wherein said auxiliary circuit comprises:
- a memory element which memorizes an utput voltage level of said one of said parallelable power supplies and discharges an electric energy stored therein to an inverting input terminal of said comparator of said voltage comparator circuit when said one of said parallelable power supplies is short-circuited; and
- a voltage switch for being controlled by said memory element to establish a discharge loop for said memory element to discharge said electric energy stored therein to said inverting input terminal of said comparator of said voltage comparator circuit, so as to drive said voltage comparator circuit to turn said field effect transistor off.

13. A device according to claim 12 wherein said memory element comprises a capacitor.

14. A device according to claim 12 wherein said voltage switch comprises a diode.

15. A device according to claim 11 wherein said auxiliary circuit comprises:
- a memory element which memorizes an output voltage level of said one of said parallelable power supplies and discharges an electric energy stored therein when said one of said parallelable power supplies is short-circuited; and
- a gate driving circuit for driving said field effect transistor to turn off when said one of said parallelable power supplies is short-circuited by way of receiving said electric energy from said memory element.

16. A device according to claim 15 wherein said memory element comprises a capacitor.

17. A device according to claim 15 wherein said gate driving circuit comprises a bipolar junction transistor.

\* \* \* \* \*